(12) United States Patent
Yamaguchi (10) Patent No.: US 9,111,683 B2
(45) Date of Patent: Aug. 18, 2015

(54) DIELECTRIC CERAMIC AND LAMINATED CERAMIC CAPACITOR

(71) Applicant: MURATA MANUFACTURING CO., LTD., Nagaokakyo-Shi, Kyoto-fu (JP)

(72) Inventor: Shinichi Yamaguchi, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 2 days.

(21) Appl. No.: 14/022,343

(22) Filed: Sep. 10, 2013

(65) Prior Publication Data

US 2014/0009868 A1  Jan. 9, 2014

Related U.S. Application Data

(63) Continuation of application No. PCT/JP2012/056576, filed on Mar. 14, 2012.

(30) Foreign Application Priority Data

Mar. 16, 2011 (JP) .................... 2011-057415

(51) Int. Cl.
*C04B 35/468* (2006.01)
*H01G 4/10* (2006.01)
(Continued)

(52) U.S. Cl.
CPC .......... *H01G 4/018* (2013.01); *C04B 35/4682* (2013.01); *C04B 35/62685* (2013.01); *H01B 3/12* (2013.01); *H01G 4/1227* (2013.01); *H01G 4/30* (2013.01); *C04B 2235/3206* (2013.01); *C04B 2235/3208* (2013.01);
(Continued)

(58) Field of Classification Search
CPC .......................... C04B 35/4682; H01G 4/1227
USPC ........................................ 501/139; 361/321.4
See application file for complete search history.

(56) References Cited

U.S. PATENT DOCUMENTS 7,595,975 B2  9/2009  Suzuki et al.
7,662,250 B2  2/2010  Nonaka et al.
(Continued)

FOREIGN PATENT DOCUMENTS

JP    11-130531    5/1999
JP    11-219843    8/1999
(Continued)

OTHER PUBLICATIONS

PCT/JP2012/056576 Written Opinion dated May 31, 2012.
(Continued)

*Primary Examiner* — Karl Group
(74) *Attorney, Agent, or Firm* — Arent Fox LLP (57) ABSTRACT

A dielectric ceramic that contains, as its main constituent, main-phase grains including a perovskite-type compound containing Ba, Ca, and Ti; first heterogeneous-phase grains containing Ca, a rare-earth element, and Si; and second heterogeneous-phase grains containing no Ca and containing the rare-earth element and Si. The second heterogeneous-phase grains are present in the dielectric ceramic in a ratio of 0.05 or less (including 0) of the number of the second heterogeneous-phase grains to the total of the first heterogeneous-phase grains and the second heterogeneous-phase grains. In the first heterogeneous-phase grains, the content of Ca is preferably 8% or more in terms of molar ratio with respect to the total content of Ca, the rare-earth element, and Si.

19 Claims, 1 Drawing Sheet

(51) Int. Cl.
*H01G 4/018* (2006.01)
*C04B 35/626* (2006.01)
*H01B 3/12* (2006.01)
*H01G 4/12* (2006.01)
*H01G 4/30* (2006.01)

(52) U.S. Cl.
CPC ............... *C04B 2235/3224* (2013.01); *C04B 2235/3225* (2013.01); *C04B 2235/3239* (2013.01); *C04B 2235/3262* (2013.01); *C04B 2235/3427* (2013.01); *C04B 2235/3454* (2013.01); *C04B 2235/652* (2013.01); *C04B 2235/6562* (2013.01); *C04B 2235/6567* (2013.01); *C04B 2235/6582* (2013.01); *C04B 2235/6584* (2013.01); *C04B 2235/6588* (2013.01); *C04B 2235/79* (2013.01); *C04B 2235/80* (2013.01)

(56) References Cited

U.S. PATENT DOCUMENTS

| | | | |
|---|---|---|---|
| 8,445,397 B2 * | 5/2013 | Yamaguchi | 501/139 |
| 8,830,651 B2 * | 9/2014 | Yamaguchi | 361/301.4 |
| 2008/0236723 A1 * | 10/2008 | Nonaka et al. | 156/89.14 |

FOREIGN PATENT DOCUMENTS

| | | | |
|---|---|---|---|
| JP | 2002-293617 | | 10/2002 |
| JP | 20004107200 | * | 4/2004 |
| JP | 2007-119275 A | | 5/2007 |
| JP | 2008-247656 A | | 10/2008 |
| JP | S44-80367 | | 3/2010 |
| WO | WO-2008-004393 | | 1/2008 |

OTHER PUBLICATIONS

PCT/JP2012/056576 ISR dated May 31, 2012.

* cited by examiner

DIELECTRIC CERAMIC AND LAMINATED CERAMIC CAPACITOR

CROSS REFERENCE TO RELATED APPLICATIONS

The present application is a continuation of International application No. PCT/JP2012/056576, filed Mar. 14, 2012, which claims priority to Japanese Patent Application No. 2011-057415, filed Mar. 16, 2011, the entire contents of each of which are incorporated herein by reference.

FIELD OF THE INVENTION

The present invention relates to a dielectric ceramic and a laminated ceramic capacitor, and more particularly, to a dielectric ceramic suitable for a dielectric material for a small-sized and high-capacitance laminated ceramic capacitor, and a laminated ceramic capacitor manufactured with the use of the dielectric ceramic.

BACKGROUND OF THE INVENTION

With the development of electronics technology in recent years, the reduction in size and the increase in capacitance have been rapidly advanced on laminated ceramic capacitors. Further, with the reduction in size and increase in capacitance for laminated ceramic capacitors, dielectric ceramic layers have been also progressively reduced in thickness, and the development of laminated ceramic capacitors including dielectric ceramic layers of 1 μm or less in thickness has been also actively carried out.

Due to the fact that the dielectric ceramic layers reduced in thickness increases the electric field applied to the dielectric ceramic layers, and it is important to ensure reliability under high-temperature load. Moreover, the applied electric field is increased more and more with the reduction in thickness for the dielectric ceramic layers, and it is thus becoming hard to achieve desired high reliability.

As an approach for improving the reliability of laminated ceramic capacitors, it has been conventionally common to add a rare-earth element such as Y, Dy, Ho, and Gd, which has the effect of suppressing the movements of oxygen vacancies, to a BaTiO$_3$ based composition as a main constituent, while it is important to control crystal triple points and heterogeneous-phases (segregation phases) in order to address the reduction in thickness for dielectric ceramic layers.

For example, Patent Document 1 proposes a dielectric ceramic including: main crystal grains composed of a perovskite-type composite oxide containing Ba, Ti, a rare-earth element, Mg, and Mn as metal elements; and an interfacial grain boundary phase and a triple-point grain boundary phase formed by the main crystal grains, where a crystalline phase composed of Ca$_4$Y$_6$O(SiO$_4$)$_6$ is present in the triple-point grain boundary phase.

In the case of Patent Document 1, in the formation of the dielectric ceramic, the formation of a crystalline phase composed of Ca$_4$Y$_6$O(SiO$_4$)$_6$ within the dielectric ceramic, in particular, at the crystal triple point which easily discharges and undergoes a significant decrease in dielectric breakdown voltage can increase the insulation property of the crystal triple point, thereby improve temperature characteristics of electrostatic capacitance even when dielectric layers are reduced in thickness, and makes it possible to improve the high-temperature load life.

Patent Document 1: Japanese Patent No. 4480367 (claims 1, 2, and 5; paragraph [0020])

SUMMARY OF THE INVENTION

However, in the case of Patent Document 1, while the Ca$_4$Y$_6$O(SiO$_4$)$_6$ phase is formed at the crystal triple point to improve the high-temperature load life, there is a possibility of causing a decrease in high-temperature load life, if a heterogeneous-phase other than the Ca$_4$Y$_6$O(SiO$_4$)$_6$ phase is formed at the crystal triple point or in crystal grains. In particular, the proportion of heterogeneous-phases in crystal grains is increased as the dielectric ceramic layers are reduced in thickness to on the order of 1 μm, and thus, when a high electric field of 20 kV/mm or more is applied to the dielectric ceramic layers with these heterogeneous-phases formed therein, there is a possibility of causing a significant decrease in high-temperature load life.

The present invention has been achieved in view of these circumstances, and an object of the present invention is to provide a dielectric ceramic that can achieve a sufficient high-temperature load life even when a high electric field is applied for a long period of time in the case of reduction in layer thickness to on the order of 1 μm, with desired high reliability, and a laminated ceramic capacitor manufactured with the use of the dielectric ceramic.

While dielectric ceramics containing a composite oxide of barium titanate as its main constituent preferably include Ca that makes a contribution to an improvement in high-temperature load life and heterogeneous-phase grains (first heterogeneous-phase grains) containing a rare-earth element and Si, earnest studies carried out by the inventor have found that as the dielectric ceramics are reduced in layer thickness, second heterogeneous-phase grains containing no Ca and containing a rare-earth element and Si are likely to be formed besides the first heterogeneous-phase grains, and moreover, found that the second heterogeneous-phase grains have the action of decreasing the high-temperature load life. Therefore, it is conceivable that even when the second heterogeneous-phase grains are formed besides the first heterogeneous-phase grains with the reduction in layer thickness of dielectric ceramic, it is possible to improve the high-temperature load life by increasing the abundance ratio of the first heterogeneous-phase grains while decreasing the abundance ratio of the second heterogeneous-phase grains.

The inventor has found, as a result of repeated earnest studies from this point of view, that the ratio of the number of the second heterogeneous-phase grains to the total of the respective numbers of the first heterogeneous-phase grains and of the second heterogeneous-phase grains, which is controlled to 0.05 or less (including 0), can achieve a favorable high-temperature load life, even when a high electric field of 20 kV/mm is applied for a long period of time under a high-temperature atmosphere. In addition, it has been determined that it is effective to use, as a main constituent, a perovskite-type compound of barium titanate with some of Ba substituted with Ca, in order to obtain the first heterogeneous-phase grains containing therein a Ca constituent.

The present invention has been achieved in view of these findings, and a dielectric ceramic according to the present invention contains, as its main constituent, main-phase grains including a perovskite-type compound containing Ba, Ca, and Ti, and includes at least first heterogeneous-phase grains containing Ca, a rare-earth element, and Si, which is characterized in that second heterogeneous-phase grains containing no Ca and containing a rare-earth element and Si are 0.05 or less (including 0) in terms of the ratio of the number of the second heterogeneous-phase grains to the total of the respective numbers of the first heterogeneous-phase grains and of the second heterogeneous-phase grains.

Thus, a dielectric ceramic can be achieved which has a favorable high-temperature load life even when a high electric field of 20 kV/mm or more is applied to a thin layer of the ceramic on the order of 1 μm.

It is to be noted that the "heterogeneous-phase grains" in the present invention refers to a phase in which grains have an equivalent circle diameter of 0.1 μm or more, and the proportion of elements other than Ba and Ti is 50% or more in terms of molar ratio for the total atomic weight excluding O (oxygen).

In addition, in the dielectric ceramic according to the present invention, Ca contained in the main-phase grains are preferably present at least near the centers of the main-phase grains.

Thus, even when the high electric field mentioned above is applied, a dielectric ceramic can be achieved which has a favorable high-temperature load life while ensuring desired electrical characteristics.

In the dielectric ceramic according to the present invention, the rare-earth element preferably includes at least one or more selected from among Y, Gd, Tb, Dy, Ho, Er, Tm, and Yb.

In addition, in the dielectric ceramic according to the present invention, the content of Ca is preferably 8% or more in terms of molar ratio with respect to the total content of Ca, the rare-earth element, and Si in the first heterogeneous-phase grains.

Thus, a further favorable high-temperature load life can be achieved.

In addition, in the dielectric ceramic according to the present invention, the content of Ca contained in the main-phase grains is preferably 3 to 16 parts by mol with respect to 100 parts by mol of Ti contained in the main-phase grains.

Thus, a further favorable high-temperature load life can be achieved without causing any grain growth.

Furthermore, in the dielectric ceramic according to the present invention, the content of the rare-earth element is preferably 1.0 part by mol or more with respect to 100 parts by mol of Ti.

Thus, the rare-earth element can produce the effect of suppressing the movements of oxygen vacancies, so that a favorable high-temperature load life can be achieved.

In addition, in the dielectric ceramic according to the present invention, the content of Si is preferably 0.5 to 2.5 parts by mol with respect to 100 parts by mol of Ti.

Thus, a dielectric ceramic can be achieved which has a further favorable high-temperature load life without having the electric field locally concentrated.

In addition, in a laminated ceramic capacitor according to the present invention, which has dielectric layers and internal electrodes alternately stacked, the dielectric layers are characteristically formed from the dielectric ceramic according to any of the aspects of the present invention.

Thus, a laminated ceramic capacitor can be achieved which can achieve an adequate high-temperature load life with high reliability, even when a high electric field of 20 kV/mm or more is applied to dielectric layers reduced in thickness to on the order of 1 μm.

The dielectric ceramic according to the present invention contains, as its main constituent, main-phase grains including a perovskite-type compound containing Ba, Ca, and Ti, and includes at least first heterogeneous-phase grains containing Ca, a rare-earth element, and Si, and in the dielectric ceramic, second heterogeneous-phase grains containing no Ca and containing a rare-earth element and Si are 0.05 or less (including 0) in terms of the ratio of the number of the second heterogeneous-phase grains to the total of the respective numbers of the first heterogeneous-phase grains and of the second heterogeneous-phase grains. Thus, even when a high electric field of 20 kV/mm or more is applied to a thin layer on the order of 1 μm, a dielectric ceramic can be achieved which has a favorable high-temperature load life.

In addition, in the laminated ceramic capacitor according to the present invention, the dielectric layers are formed from the dielectric ceramic according to any of the aspects of the present invention and, a laminated ceramic capacitor can be thus achieved which can achieve an adequate high-temperature load life with high reliability, even when a high electric field of 20 kV/mm or more is applied to the dielectric layers reduced in thickness to on the order of 1 μm.

DETAILED DESCRIPTION OF THE INVENTION

Figure 1:
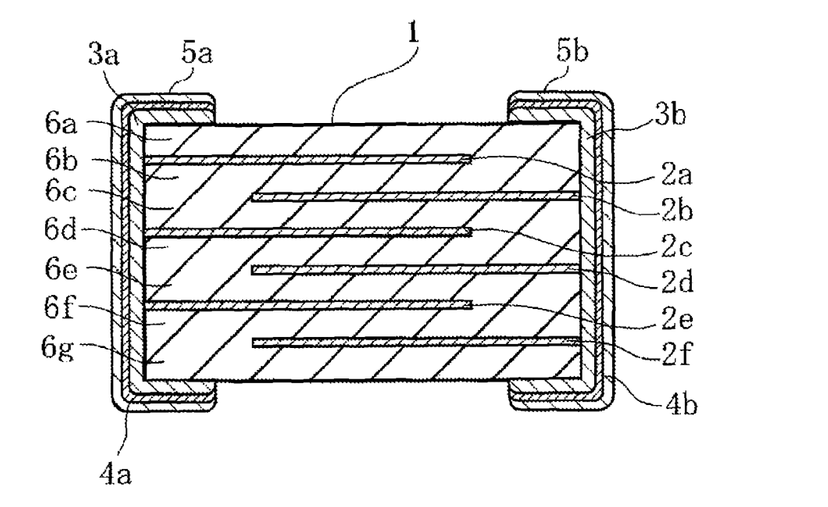
The FIGURE is a cross-sectional view illustrating an embodiment of a laminated ceramic capacitor manufactured with the use of a dielectric ceramic according to the present invention.

Next, an embodiment of the present invention will be described in detail

A dielectric ceramic as an embodiment of the present invention contains, as its main constituent, main-phase grains including a perovskite-type compound (general formula: $ABO_3$) of barium titanate containing Ba, Ca, and Ti with some of Ba modified by Ca, and includes at least first heterogeneous-phase grains containing Ca, a rare-earth element, and Si.

The "heterogeneous-phase grains" herein refers to a phase in which grains have an equivalent circle diameter of 0.1 μm or more, and the proportion of elements other than Ba and Ti is 50% or more in terms of molar ratio for the total atomic weight excluding O (oxygen).

In the case of the dielectric ceramic containing, as its main constituent, the main-phase grains including the perovskite-type compound of barium titanate, it is common to add, to the $BaTiO_3$ as the main-phase grains, a rare-earth element that has the effect of suppressing the movements of oxygen vacancies, in order to increase the high-temperature load life, and heterogeneous-phase grains are likely to be generated in the crystalline phase. Further, among these heterogeneous-phase grains, first heterogeneous-phase grains containing Ca, the rare-earth element, and Si make a contribution to an improvement in high-temperature load life. Therefore, the dielectric ceramic formed from the main-phase grains and the first heterogeneous-phase grains makes it possible to achieve a dielectric ceramic that has a favorable high-temperature load life even when a high electric field of 20 kV/mm or more is applied to a thin layer of the ceramic on the order of 1 μm.

However, among the heterogeneous-phase grains, there are second heterogeneous-phase grains containing no Ca and containing the rare-earth element and Si, besides the first heterogeneous grains described above. Further, the second heterogeneous-phase grains have the action of significantly decreasing the high-temperature load life.

Moreover, as dielectric ceramic layers are reduced in thickness to on the order of 1 μm, the ratio of the heterogeneous-phase grains is increased among the crystal grains. Therefore, in order to stably achieve a favorable high-temperature load life for ensuring reliability, it is important to control the number of these heterogeneous-phase grains, and in particular, when a high electric field of 20 kV/mm or more is applied, it is extremely important to control the heterogeneous-phase grains.

Hence, in the present embodiment, due to the fact that the first heterogeneous-phase grains make a contribution to an improvement in high-temperature load life, whereas the second heterogeneous-phase grains significantly decrease the high-temperature load life, the heterogeneous-phase grains are controlled by relatively increasing the number of the first heterogeneous-phase grains while relatively decreasing the number of the second heterogeneous-phase grains. Specifically, if the ratio of the number B of the second heterogeneous-phase grains exceeds 0.05 to the total (A+B) of the number A of the first heterogeneous-phase grains and the number B of the second heterogeneous-phase grains, there is a possibility that the number B of the second heterogeneous-phase grains will be excessively increased to cause a decrease in high-temperature load life. For this reason, the number of the second heterogeneous-phase grains in the dielectric ceramic is controlled so that the number A of the first heterogeneous-phase grains and the number B of the second heterogeneous-phase grains satisfy the formula (1).

$$0 \leq B/(A+B) \leq 0.05 \tag{1}$$

As described above, even when the dielectric ceramic including at least the main-phase grains and the first heterogeneous-phase grains, further includes the second heterogeneous-phase grains, the proportion of the second heterogeneous-phase grains present is controlled so that the ratio of the number B of the second heterogeneous-phase grains is 0.05 or less (including 0) to the total (A+B) of the number A of the first heterogeneous-phase grains and the number B of the second heterogeneous-phase grains, thereby achieving a dielectric ceramic that has a favorable high-temperature load life even when a high electric field of 20 kV/mm or more is applied to a thin layer of the ceramic on the order of 1 μm.

Furthermore, in order to control the numbers of the first and second heterogeneous-phase grains so as to satisfy the formula (1), it is necessary for the first heterogeneous-phase grains to contain Ca therein, and to that end, it is effective to form the main-phase grains as a main constituent from a perovskite-type compound of barium titanate represented by the composition formula $(Ba_{1-x}Ca_x)_m TiO_3$ with some of Ba substituted with Ca. In the composition formula herein, x represents the content of Ca in terms of parts by mol (hereinafter, referred to as a "molar substitution") with respect to the total molar quantity, 1 part by mol of Ba and Ca, and m represents the total of Ba and Ca in terms of parts by mol (hereinafter, referred to as a "compounding molar ratio") with respect to 1 part by mol of Ti.

This use of the perovskite-type compound of barium titanate represented by $(Ba_{1-x}Ca_x)_m TiO_3$ as the main-phase grains to serve as a main constituent can make Ca present homogeneously or substantially homogeneously in a ceramic raw material powder, and efficiently form the first heterogeneous-phase grains which make a contribution to an improvement in high-temperature load life.

It is to be noted that while the compounding molar ratio m is supposed to be 1.000 stoichiometrically, the compound is also provided so that one of the A site (Ba site) and the B site (Ti site) is excessive, if necessary, to such an extent that has no effect on the various properties or characteristics, sinterability, etc.

In addition, while the form of the main-phase grains is not to be considered particularly limited, the Ca in the main-phase grains is preferably present at least near the centers of the main-phase grains, that is, in core regions of the main-phase grains rather than in peripheral regions thereof, from the perspective of ensuring desired favorable electrical characteristics.

In addition, the content of Ca is preferably 8% or more in terms of molar ratio with respect to the total content of Ca, the rare-earth element, and Si contained in the first heterogeneous-phase grains. More specifically, the controlled content of Ca contained in the first heterogeneous-phase grains to 8% or more in terms of molar ratio relatively increases Ca, thereby making it possible to further improve the high-temperature load life. In other words, if the composition ratio of Ca in the first heterogeneous-phase grains is less than 8%, there is a possibility of decreasing the effect of improvement in high-temperature load life by the existence of the first heterogeneous-phase grains.

Further, in order to control the content of Ca in the first heterogeneous-phase grains to 8% or more in terms of molar ratio, the content of Ca contained in the main-phase grains is preferably 3 parts by mol or more with respect to 100 parts by mol of Ti contained in the main-phase grains.

However, if the Ca content exceeds 16 parts by mol with respect to 100 parts by mol of the Ti, the reduced lattice volume of the perovskite-type compound containing Ba, Ca, and Ti makes the accessory constituents such as the rare-earth element and Si more likely to be present as a solid solution in the perovskite-type compound, thereby making it difficult to control the grain growth, and possibly resulting in a tendency to decrease the high-temperature load life.

Therefore, the Ca content in the main-phase grains is preferably 3 to 16 parts by mol with respect to 100 parts by mol of Ti contained in the main-phase grains.

In addition, the content of Si is preferably 0.5 parts by mol or more with respect to 100 parts by mol of Ti. More specifically, if the Si content is less than 0.5 parts by mol with respect to 100 parts by mol of Ti, the decreased content of the Si constituent which acts as a sintering aid results in insufficient densification, and in a locally concentrated electric field, and for this reason, there is a possibility of causing a decrease in high-temperature load life.

However, if the Si content exceeds 2.5 parts by mol with respect to 100 parts by mol of Ti, the Si content is increased in the first heterogeneous-phase grains, and the content of Ca in the first heterogeneous-phase grains is thus less than 8% in terms of molar ratio. Therefore, from the perspective of achieving a further preferred high-temperature load life, the Si content is preferably less than 2.5 parts by mol with respect to 100 parts by mol of Ti.

Therefore, the Si content is preferably 0.5 to 2.5 parts by mol with respect to 100 parts by mol of Ti.

In addition, the content of the rare-earth element is preferably 1.0 part by mol or more with respect to 100 parts by mol of Ti. If the content of the rare-earth element is less than 1.0 part by mol with respect to 100 parts by mol of Ti, the effect of suppressing the movements of oxygen vacancies by the addition of the rare-earth element can achieved insufficiently, and there is possibility of resulting in an inability to expect an adequate improvement in high-temperature load life.

Further, while this rare-earth element is not to be considered particularly limited, the rare-earth element preferably includes at least one or more selected from among Y, Gd, Tb, Dy, Ho, Er, Tm, and Yb.

In addition, the dielectric ceramic preferably contains various types of additives, for example, Mg, Mn, V, etc., if necessary.

The FIGURE is a cross-sectional view schematically illustrating an embodiment of a laminated ceramic capacitor manufactured with the use of a dielectric ceramic according to the present invention.

The laminated ceramic capacitor has internal electrodes 2a to 2f buried in a ceramic body 1, has external electrodes 3a, 3b formed on both ends of the ceramic body 1, and further has first plating films 4a, 4b and second plating films 5a, 5b formed on the surfaces of the external electrodes 3a, 3b.

More specifically, the ceramic body 1 is composed of dielectric layers 6a to 6g formed from the dielectric ceramic according to the present invention and the internal electrode layers 2a to 2f stacked alternately and subjected to firing, and the internal electrode layers 2a, 2c, 2e are electrically connected to the external electrode 3a, whereas the internal electrode layers 2b, 2d, 2f are electrically connected to the external electrode 3b. Furthermore, electrostatic capacitance is formed between the opposed surfaces of the internal electrode layers 2a, 2c, 2e and of the internal electrode layers 2b, 2d, 2f.

Next, a method for manufacturing the laminated ceramic capacitor described above will be described in detail.

First, a Ba compound containing Ba, a Ca compound containing Ca, and a Ti compound containing Ti are prepared as ceramic raw materials. Then, these ceramic raw materials are weighed in predetermined amounts, and the weighed materials are put along with grinding media such as PSZ (Partially Stabilized Zirconia) balls and pure water into a ball mill, subjected to sufficient mixing and grinding in a wet way, and to drying, and then subjected to a calcination treatment at a temperature of 950° C. to 1150° C. for a predetermined period of time, thereby preparing a main constituent powder of a perovskite-type compound containing Ba, Ca, and Ti with an average grain size of 0.1 to 0.2 μm (synthesis of main-phase grain).

Next, as accessory constituent powders, a rare-earth compound containing a rare-earth element and a Si compound containing Si, and if necessary, a Mg compound containing Mg, a Mn compound containing Mn, and a V compound containing V are prepared, and weighed in predetermined amounts. Then, these weighed compounds are put along with grinding media and pure water into a ball mill, and subjected to sufficient mixing and grinding in a wet way, mixing, and a drying treatment, thereby preparing a ceramic raw material powder.

It is to be noted that if a Ca compound, for example, $CaCO_3$ is added, and then subjected to firing after the synthesis of $Ba_mTiO_3$ in the process of preparing the ceramic raw material powder, it is difficult to disperse Ca homogeneously or substantially homogeneously in the unfired ceramic raw material powder, and for this reason, there is a possibility that sintering will be completed before Ca is bonded to one of the rare-earth element and Si.

Therefore, as described above, the ceramic raw material powder is preferably prepared by preparing the main constituent powder containing Ba, Ca, and Ti, and then adding various types of accessory constituent powders.

Then, this ceramic raw material powder is put along with an organic binder and an organic solvent, as well as grinding media, into a ball mill for carrying out wet mixing, thereby preparing a ceramic slurry, and the ceramic slurry is subjected to shape forming by a RIP method, a doctor blade method, and the like, for preparing ceramic green sheets so as to have a thickness on the order of 2 μm or less.

Then, the conductive paste for internal electrodes is used to apply screen printing onto the ceramic green sheets, thereby forming a conductive film in a predetermined pattern on the surfaces of the ceramic green sheets.

It is to be noted that while the conductive material contained in the conductive paste for internal electrodes is not to be considered particularly limited, it is preferable to use a base metal material containing, as its main constituent, one of Ni, Cu, and an alloy thereof in terms of reduction in cost.

Then, the multiple ceramic green sheets with the conductive films formed are stacked in a predetermined direction, sandwiched between ceramic green sheets with no conductive films formed, subjected to pressure bonding, and cut into a predetermined size to prepare a ceramic laminated body. Then, the ceramic laminated body is thereafter subjected to a binder removal treatment at a temperature of 300 to 500° C., and further subjected to a firing treatment at a firing temperature of 1100 to 1300° C. for about 2 hours in accordance with a predetermined firing profile, under a reducing atmosphere composed of a $H_2$—$N_2$—$H_2O$ gas with an oxygen partial pressure controlled to $10^{-9}$ to $10^{-12}$ MPa. This firing treatment provides co-sintered conductive films and ceramic green sheets, thereby resulting in the ceramic body 1 with the internal electrodes 2a to 2f buried therein.

Next, a conductive paste for external electrodes is applied onto both end surfaces of the ceramic body 1, and subjected to a baking treatment at a temperature of 600 to 800° C. to form the external electrodes 3a, 3b.

It is to be noted that while the conductive material contained in the conductive paste for external electrodes is also not to be considered particularly limited, it is preferable in terms of reduction in cost to use a material containing one of Ag, Cu, and an alloy thereof as its main constituent.

In addition, as a method for forming the external electrodes 3a, 3b, the conductive paste for external electrodes may be applied onto the both end surfaces of the ceramic laminated body, and then subjected to a firing treatment at the same time as the ceramic laminated body.

Then, finally, electrolytic plating is applied to form first plating films 4a, 4b composed of Ni, Cu, a Ni—Cu alloy, or the like on the surfaces of the external electrodes 3a, 3b, and further form second plating films 5a, 5b composed of solder, tin, or the like on the surfaces of the first plating films 4a, 4b, thereby manufacturing the laminated ceramic capacitor.

Thus, in the laminated ceramic capacitor, the dielectric ceramic layers 6a to 6g are formed from the dielectric ceramic according to the present invention and, a laminated ceramic capacitor can be thus achieved which can achieve an adequate high-temperature load life with high reliability, even when a high electric field of 20 kV/mm or more is applied to the dielectric ceramic layers 6a to 6g reduced in thickness to on the order of 1 μm.

It is to be noted that the present invention is not to be considered limited to the embodiment described above. For example, while the first and second heterogeneous-phase grains have been described above as the heterogeneous-phase grains in the embodiment, the dielectric ceramic may contain therein heterogeneous-phase grains other than the first and second heterogeneous-phase grains, as long as the formula (1) mentioned above is satisfied.

In addition, the ceramic raw materials such as the Ba compound, the Ca compound, and the Ti compound can be selected appropriately depending on the mode of the synthesis reaction, such as carbonates, oxides, nitrates, hydroxides, organic acid salts, alkoxides, and chelate compounds.

Next, examples of the present invention will be described specifically.

Example 1

Preparation of Samples (Sample Numbers 1 to 6)

High-purity $BaCO_3$, $CaCO_3$, and $TiO_2$ were prepared as ceramic raw materials, and these ceramic raw materials were weighed for the molar substitution x and compounding molar ratio m of Ca as shown in Table 1. Then, these weighed materials were put along with PSZ balls and pure water into a ball mill, subjected to sufficient mixing and grinding in a wet way, and to drying, and then subjected to calcination at a temperature of 1050° C. for about 2 hours, thereby preparing main constituent powders with an average grain size of 0.20 μm (synthesis of main-phase grains).

Next, $Y_2O_3$, $SiO_2$, MgO, $MnCO_3$, and $V_2O_5$ were prepared as accessory constituent powders. Then, these accessory constituent powders were weighed for the contents of Y, Si, Mg, Mn, and V in terms of parts by mol as shown in Table 1 with respect to 100 parts by mol of the Ti contained in the main constituent powder, and subjected to wet mixing in a ball mill, and to a drying treatment to obtain ceramic raw material powders.

Further, it has been confirmed by an ICP (inductively-coupled plasma) emission spectrometric analysis that the obtained ceramic raw material powders are nearly identical to the prepared compositions shown in Table 1.

Then, the ceramic raw material powder was put along with ethanol and a polyvinyl butyral based binder, as well as a plasticizer and PSZ balls, into a ball mill for carrying out wet mixing, thereby preparing a ceramic slurry, and the ceramic slurry was further subjected to shape forming by a RIP method, thereby preparing ceramic green sheets so as to have a thickness of 1.5 μm.

Then, the conductive paste for internal electrodes, containing a Ni powder, was used to apply screen printing onto the ceramic green sheets, thereby forming a conductive film in a predetermined pattern on the surfaces of the ceramic green sheets.

Then, predetermined numbers of ceramic green sheets with the conductive films formed thereon were stacked, sandwiched between ceramic green sheets with no conductive films formed, subjected to pressure bonding, and cut into a predetermined size to prepare ceramic laminated bodies. Then, the ceramic laminated bodies were thereafter subjected to a binder removal treatment at a temperature of 350° C. for 3 hours under a nitrogen atmosphere, and further, to a firing treatment at a maximum temperature of 1220° C. for about 3 hours under a reducing atmosphere composed of a $H_2$—$N_2$—$H_2O$ gas with an oxygen partial pressure controlled to $10^{-10}$ MPa, thereby providing co-sintered conductive films and ceramic material to prepare ceramic bodies with internal electrodes buried therein.

It is to be noted that the firing conditions were set to the rate of temperature rise, oxygen partial pressure, and maximum temperature holding time as shown in Table 1, thereby controlling the generation of heterogeneous-phase grains.

Then, the conductive paste for external electrodes, containing a Cu powder and glass frit was applied onto both end surfaces of the ceramic bodies, and subjected to a baking treatment at a temperature of 800° C. under a nitrogen atmosphere to form external electrodes, thereby preparing samples of sample numbers 1 to 6.

For each of the obtained samples, the dielectric ceramic layers were 1.2 μm in thickness, the external dimensions were all 2.0 mm in length, 1.2 mm in width, and 1.0 mm in thickness, the electrode area opposed per dielectric ceramic layer was 2.8 mm², and the effective number of layers stacked was 5.

Further, it has been confirmed by an ICP emission spectrometric analysis that the respective samples of sample numbers 1 to 6 with the external electrodes removed therefrom, and then the ceramic bodies dissolved in a solvent are nearly identical to the prepared compositions shown in Table 1, except for Ni as an internal electrode constituent.

In addition, it has been confirmed by an XRD structure analysis of the ceramic body that the respective samples with the external electrodes removed therefrom have a perovskite-type structure.

(Sample Numbers 7 and 8)

$BaCO_3$ and $TiO_2$ were used as ceramic raw materials to prepare main constituent powders in accordance with the same method and procedure as for sample numbers 1 to 6.

Then, $Y_2O_3$, $SiO_2$, MgO, $MnCO_3$, and $V_2O_5$ were used as accessory constituent powders to obtain ceramic raw material powders in accordance with the same method and procedure as for sample numbers 1 to 6.

Further, it has been confirmed by an ICP emission spectrometric analysis that the obtained ceramic raw material powders are nearly identical to the prepared compositions shown in Table 1.

Then, respective samples of sample numbers 7 and 8 were thereafter prepared in accordance with the same method and procedure as for sample numbers 1 to 6.

Further, it has been confirmed by an ICP emission spectrometric analysis that the respective samples of sample numbers 7 and 8 with the external electrodes removed therefrom, and then the ceramic bodies dissolved in a solvent are nearly identical to the prepared compositions shown in Table 1, except for Ni as an internal electrode constituent.

In addition, it has been confirmed by an XRD structure analysis of the ceramic body that the respective samples with the external electrodes removed therefrom have a perovskite-type structure.

(Sample Number 9)

$BaCO_3$ and $TiO_2$ were used as ceramic raw materials to prepare main constituent powders in accordance with the same method and procedure as for sample numbers 1 to 6.

Then, except that 1.0 part by mol of $CaCO_3$ was added with respect to 100 parts by mol of the Ti contained in the main constituent, in addition to $Y_2O_3$, $SiO_2$, MgO, $MnCO_3$, and $V_2O_5$ as accessory constituent powders, a ceramic raw material powder was obtained in accordance with the same method and procedure as for sample numbers 1 to 6.

Further, it has been confirmed by an ICP emission spectrometric analysis that the obtained ceramic raw material powders are nearly identical to the prepared compositions shown in Table 1.

Then, a sample of sample number 9 was thereafter prepared in accordance with the same method and procedure as for sample numbers 1 to 6.

Further, it has been confirmed by an ICP emission spectrometric analysis that the sample of sample number 9 with the external electrodes removed therefrom, and then the ceramic bodies dissolved in a solvent are also nearly identical to the prepared composition shown in Table 1, except for Ni as an internal electrode constituent.

Furthermore, it has been confirmed by an XRD structure analysis of the ceramic body that the sample with the external electrodes removed therefrom has a perovskite-type structure.

Table 1 shows, for each sample of sample numbers 1 to 9, x and m in the $(Ba_{1-x}Ca_x)_mTiO_3$ as main-phase grains, and the molar content (parts by mol) with respect to 100 parts by mol of Ti for each constituent of Y, Si, Mg, Mn, V, and Ca added as accessory constituent powders.

TABLE 1

| Sample Number | $(Ba_{1-x}Ca_x)_m TiO_3$ | | Molar Content of Accessory Constituent (parts by mol) | | | | | |
|---|---|---|---|---|---|---|---|---|
| | x | m | Y | Si | Mg | Mn | V | Ca |
| 1 | 0.030 | 1.010 | 4.0 | 1.5 | 0.5 | 0.5 | 0.1 | 0 |
| 2 | 0.030 | 1.010 | 4.0 | 1.5 | 0.5 | 0.5 | 0.1 | 0 |
| 3*[1) | 0.030 | 1.010 | 4.0 | 1.5 | 0.5 | 0.5 | 0.1 | 0 |
| 4*[1) | 0.030 | 1.010 | 4.0 | 1.5 | 0.5 | 0.5 | 0.1 | 0 |
| 5*[1) | 0.030 | 1.010 | 4.0 | 1.5 | 0.5 | 0.5 | 0.1 | 0 |
| 6*[1) | 0.030 | 1.010 | 4.0 | 1.5 | 0.5 | 0.5 | 0.1 | 0 |
| 7*[1) | 0 | 1.010 | 4.0 | 1.5 | 0.5 | 0.5 | 0.1 | 0 |
| 8*[1) | 0 | 1.010 | 4.0 | 1.5 | 0.5 | 0.5 | 0.1 | 0 |
| 9*[1) | 0 | 1.000 | 4.0 | 1.5 | 0.5 | 0.5 | 0.1 | 1.0 |

*[1)outside the scope of the present invention (claim 1)

[Evaluations of Samples]

For each sample of sample numbers 1 to 9, main-phase grains and heterogeneous-phase grains were identified to calculate the high-temperature load life.

(Identification of Main-Phase Grains and Heterogeneous-Phase Grains)

Each sample of sample numbers 1 to 9 was made into thin sections of 40 nm or less in thickness with the use of an ion milling method to obtain cross sections for observation.

Then, a transmission electron microscope (TEM) was used to extract multiple grains that were not overlapped with each other in a direction perpendicular to the cross section, in the cross section for observation near the centers of grains in each sample. More specifically, in the present example, the observation by the TEM in the cross section near the centers of grains in each sample, and further, the electron diffraction pattern from the TEM were used to confirm whether or not multiple grains that were not overlapped with each other in the perpendicular direction, and extract grains that were not overlapped with each other.

Subsequently, with the use of an energy dispersive X-ray analyzer (EDX), the extracted grains were subjected to a mapping analysis for each grain under TEM observation. Then, from the species of the elements constituting each grain, the respective grains were classified into the group of main-phase grains and the group of grains other than the main-phase grains.

Then, 20 of the main-phase grains were randomly extracted, and each grain was subjected to a TEM-EDX analysis near the center of the grain. As a result, Ba, Ti, and Ca were detected in sample numbers 1 to 6, and in sample numbers 7 to 9, Ba and Ti were detected, whereas Ca was not detected.

Next, TEM images of the grains other than the main-phase grains were subjected to an image analysis to find the area inside the grain boundary of each grain, calculate the equivalent circle diameter, and extract grains of 0.1 μm or more in equivalent circle diameter.

Subsequently, 100 grains were randomly extracted from the extracted grains, and subjected to a TEM-EDX analysis near the center of each grain. Then, grains containing Ca, Y, and Si, in which the proportion of elements other than Ba and Ti was 50% or more in terms of molar ratio for the total atomic weight excluding O (oxygen), were regarded as first heterogeneous-phase grains. In addition, grains containing no Ca and containing Y and Si, in which the proportion of elements other than Ba and Ti was 50% or more in terms of molar ratio for the total atomic weight excluding O (oxygen), were regarded as second heterogeneous-phase grains. Subsequently, the number A of the first heterogeneous-phase grains and the number B of the second heterogeneous-phase grains were counted to find the ratio (B/(A+B)) of the number B of the second heterogeneous-phase grains to the total number of the both types of heterogeneous-phase grains.

(Calculation of High-Temperature Load Life)

For each sample of sample numbers 1 to 9, a direct-current voltage of 24 V (20 kV/mm) was applied at a temperature of 185° C., the sample with the insulation resistance decreased to $10^5 \Omega$ or less was regarded as a defective, and the high-temperature load life was calculated from the Weibull plot.

Table 2 shows the firing conditions, identification results of heterogeneous-phase grains, ratio (B/(A+B)), and measurement results of high-temperature load life for each sample of sample numbers 1 to 9.

TABLE 2

| | Firing Condition | | | Identification Result of Heterogeneous-Phase Grain | | | |
|---|---|---|---|---|---|---|---|
| Sample Number | Rate of Temperature Rise (° C./min) | Oxygen Partial Pressure (MPa) | Maximum Temperature Holding Time (hr) | First Heterogeneous-Phase Grain | Second Heterogeneous-Phase Grain | B/(A + B) (—) | High-Temperature Load Life (hr) |
| 1 | 20 | $3.1 \times 10^{-10}$ | 2 | Yes | No | 0.00 | 34 |
| 2 | 20 | $4.3 \times 10^{-10}$ | 2 | Yes | Yes | 0.05 | 30 |
| 3*[1) | 20 | $8.0 \times 10^{-10}$ | 2 | Yes | Yes | 0.15 | 10 |
| 4*[1) | 20 | $1.0 \times 10^{-9}$ | 1 | Yes | Yes | 0.40 | 6 |
| 5*[1) | 3.33 | $3.1 \times 10^{-9}$ | 1 | No | Yes | 1.00 | 4 |
| 6*[1) | 50 | $1.0 \times 10^{-10}$ | 1 | No | No | — | 12 |
| 7*[1) | 3.33 | $3.1 \times 10^{-9}$ | 1 | No | Yes | 1.00 | 2 |
| 8*[1) | 50 | $1.0 \times 10^{-10}$ | 1 | No | No | — | 7 |
| 9*[1) | 20 | $3.1 \times 10^{-10}$ | 2 | Yes | Yes | 0.45 | 3 |

*[1)outside the scope of the present invention (claim 1)

In the case of sample numbers 3 to 5, the main-phase grains are formed from a perovskite-type compound of barium titanate with some of Ba substituted with Ca, while the B/(A+B) ranges from 0.15 to 0.40, which exceeds 0.05, thus resulting in a short high-temperature load life from 4 to 10 hours. In addition, it has been also determined that the increased oxygen partial pressure in the firing atmosphere makes the second heterogeneous-phase grains more likely to be generated.

In the case of sample number 6, the main-phase grains are formed from a perovskite-type compound of barium titanate with some of Ba substituted with Ca as in the case of sample numbers 3 to 5, while the high-temperature load life is also short, which is 12 hours, with neither the first heterogeneous-phase grains nor the second heterogeneous-phase grains generated. This is believed to mean that it was not possible to achieve any desired high-temperature load life, because first heterogeneous-phase grains contributing an improvement in high-temperature load life were also not generated while second heterogeneous-phase grains causing a decrease in high-temperature load life were not generated.

In the case of sample numbers 7 and 8, the dielectric ceramic contains no Ca therein, thus failing to generate any first heterogeneous-phase grains contributing an improvement in high-temperature load life, and also resulting in a short high-temperature load life of 2 to 7 hours. In particular, in the case of sample number 7, the high-temperature load life is extremely short, which is 2 hours, because of the generation of second heterogeneous-phase grains causing a decrease in high-temperature load life.

In the case of sample number 9, the sample has both the first heterogeneous-phase grains and the second heterogeneous-phase grains, also obtained under the same firing condition as for sample number 1 described later, while the ratio B/(A+B) is 0.45 which exceeds 0.05, thus resulting in a short high-temperature load life of 3 hours. This is believed to be because the dielectric ceramic contains Ca therein, whereas the main-phase grains contain no Ca therein, due to the fact that sintering was completed before Ca was adequately bonded to one of Y and Si, without Ca homogeneously or substantially homogeneously dispersed in the ceramic raw material powder because of the Ca contained by the subsequent addition.

In contrast, in the case of sample numbers 1 and 2, the main-phase grains are formed from a perovskite-type compound of barium titanate with some of Ba substituted with Ca, and the ratio (B/(A+B)) is 0.05 or less, which falls within the scope of the present invention in each case, thus resulting in a high-temperature load life of 30 hours or more, and it has been determined that the high-temperature load life is dramatically improved to achieve favorable reliability, as compared with sample numbers 3 to 9.

In particular, in the case of sample number 1, due to no second heterogeneous-phase grains contained, it has been determined that a further favorable high-temperature load life is achieved, even as compared with sample number 2. More specifically, it has been confirmed that the high-temperature load life is improved with fewer and fewer second heterogeneous-phase grains.

Example 2

High-purity $BaCO_3$, $CaCO_3$, and $TiO_2$ were prepared as ceramic raw materials, and these ceramic raw materials were weighed for the molar substitution x and compounding molar ratio m of Ca as shown in Table 3. Then, these weighed materials were put along with PSZ balls and pure water into a ball mill, subjected to sufficient mixing and grinding in a wet way, and to drying, and then subjected to calcination at a temperature of 1000 to 1200° C. for about 2 hours, thereby preparing main constituent powders with an average grain size of 0.20 μm (synthesis of main-phase grains).

Next, $Y_2O_3$, $SiO_2$, MgO, $MnCO_3$, and $V_2O_5$ were prepared as accessory constituent powders. Then, these accessory constituent powders were weighed for the contents of Y, Si, Mg, Mn, and V in terms of parts by mol as shown in Table 3 with respect to 100 parts by mol of the Ti contained in the main-phase grains, and subjected to wet mixing in a ball mill, and to a drying treatment to obtain ceramic raw material powders.

Further, it has been confirmed by an ICP emission spectrometric analysis that the obtained ceramic raw material powders are nearly identical to the prepared compositions shown in Table 3.

Thereafter, respective samples of sample numbers 11 to 21 were prepared in accordance with the same method and procedure as in Example 1.

It is to be noted that the following firing conditions were applied to any of the samples: 20° C./min as the rate of temperature increase; and 1220° C. as the maximum temperature and 2 hours as the maximum temperature holding time in a reducing atmosphere composed of a $H_2$—$N_2$—$H_2O$ gas with an oxygen partial pressure of $3.1 \times 10^{-10}$ MPa.

Further, it has been confirmed by an ICP emission spectrometric analysis that the respective samples of sample numbers 11 to 21 with the external electrodes removed therefrom, and then the ceramic bodies dissolved in a solvent are nearly identical to the prepared compositions shown in Table 3, except for Ni as an internal electrode constituent.

In addition, it has been confirmed by an XRD structure analysis of the ceramic body that the respective samples with the external electrodes removed therefrom have a perovskite-type structure.

Subsequently, for each sample, respective grains in a cross section for observation were classified into the group of main-phase grains and the group of grains other than the main-phase grains in the same way as in Example 1.

Then, 20 of the main-phase grains were randomly extracted, and subjected to a TEM-EDX analysis in accordance with the same method and procedure as in Example 1 to check the Ca amount with respect to 100 parts by mol of the Ti contained in the main-phase grains, thereby confirming that the average value for the 20 grains is nearly identical to the prepared composition shown in Table 3.

Next, in accordance with the same method and procedure as in Example 1, the first heterogeneous-phase grains and the second heterogeneous-phase grains were identified from the grains other than the main-phase grains to find the ratio (B/(A+B)) of the number B of the second heterogeneous-phase grains to the total number (A+B) of the first and second heterogeneous-phase grains.

Furthermore, the first heterogeneous-phase grains were subjected to a TEM-EDX analysis near the centers of the grains to measure the respective contents of Ca, Y, and Si, and find the average value for Ca/(Ca+Y+Si) in terms of molar ratio.

In addition, the high-temperature load life was found in accordance with the same method and procedure as in Example 1.

Table 3 shows the component composition, B/(A+B), Ca/(Ca+Y+Si) value for the first heterogeneous-phase grains, and high-temperature load life for each sample of sample numbers 11 to 21.

TABLE 3

| Sample Number | $(Ba_{1-x}Ca_x)_mTiO_3$ | | | Molar Content of Accessory Constituent (parts by mol) | | | | | B/(A + B) (—) | Ca/(Ca + Y + Si) (%) | High-Temperature Load Life (hr) |
|---|---|---|---|---|---|---|---|---|---|---|---|
| | x | m | x · m | Y | Si | Mg | Mn | V | | | |
| 11*[2] | 0.020 | 1.010 | 0.020 | 4.0 | 1.5 | 0.5 | 0.5 | 0.1 | 0.00 | 4.5 | 20 |
| 12 | 0.030 | 1.010 | 0.030 | 4.0 | 1.5 | 0.5 | 0.5 | 0.1 | 0.00 | 8.0 | 34 |
| 13 | 0.080 | 1.010 | 0.081 | 4.0 | 1.5 | 0.5 | 0.5 | 0.1 | 0.00 | 13.3 | 43 |
| 14 | 0.150 | 1.010 | 0.152 | 4.0 | 1.5 | 0.5 | 0.5 | 0.1 | 0.00 | 15.7 | 49 |
| 15*[3] | 0.170 | 1.010 | 0.172 | 4.0 | 1.5 | 0.5 | 0.5 | 0.1 | 0.00 | 16.2 | 15 |
| 16*[4] | 0.080 | 1.010 | 0.081 | 0.8 | 1.5 | 0.5 | 0.5 | 0.1 | 0.00 | 15.1 | 13 |
| 17 | 0.080 | 1.010 | 0.081 | 1.0 | 1.5 | 0.5 | 0.5 | 0.1 | 0.00 | 14.8 | 31 |
| 18*[5] | 0.080 | 1.010 | 0.081 | 4.0 | 0.4 | 0.5 | 0.5 | 0.1 | 0.00 | 20.4 | 18 |
| 19 | 0.080 | 1.010 | 0.081 | 4.0 | 0.5 | 0.5 | 0.5 | 0.1 | 0.00 | 19.7 | 38 |
| 20 | 0.080 | 1.010 | 0.081 | 4.0 | 2.5 | 0.5 | 0.5 | 0.1 | 0.00 | 9.7 | 35 |
| 21*[6] | 0.080 | 1.010 | 0.081 | 4.0 | 3.0 | 0.5 | 0.5 | 0.1 | 0.00 | 4.5 | 21 |

*[2]outside the scope of the present invention (claims 4, 5)
*[3]outside the scope of the present invention (claim 5)
*[4]outside the scope of the present invention (claim 6)
*[5]outside the scope of the present invention (claim 7)
*[6]outside the scope of the present invention (claims 4, 7)

In the case of sample numbers 12 to 14, 17, 19, and 20, the molar content of Ca is 0.030 to 0.152 parts by mol with respect to 1 part by mol of the Ti in the main-phase grains (3 to 15.2 parts by mol with respect to 100 parts by mol of the Ti), which falls within the range of 3 to 16 parts by mol with respect to 100 parts by mol of Ti, the molar content of Y as the rare-earth element is 1.0 to 4.0 parts by mol with respect to 100 parts by mol of the Ti, which falls within the range of 1.0 part by mol or more, the content of Si is 0.5 to 2.5 parts by mol with respect to 100 parts by mol of the Ti, and the Ca/(Ca+Y+Si) is also 8.0 to 19.7%, which falls within the range of 8.0% or more, all within the preferred ranges of the present invention, and thus, favorable reliability has been achieved with the high-temperature load life from 31 to 49 hours.

In contrast, in the case of sample number 11, the content of Ca is 2 parts by mol with respect to 100 parts by mol of Ti, which is less than 3 parts by mol, with the Ca/(Ca+Y+Si) of 4.5%, thus resulting in a high-temperature load life of 20 hours, and the improvement is shown as compared with sample numbers 3 to 9 in Example 1, while the high-temperature load life is shorter as compared with the samples within the preferred ranges mentioned above. This is believed to be because it was not possible to adequately generate the first heterogeneous-phase grains as compared with the samples within the preferred ranges, due to the smaller amount of Ca in the main-phase grains.

On the other hand, in the case of sample number 15, the high-temperature load life is 15 hours, and the improvement is shown as compared with sample numbers 3 to 9 in Example 1, while the high-temperature load life is shorter as compared with the samples within the preferred ranges. This is believed to be because, due to the fact that the Ca content is 17.2 parts by mol with respect to 100 parts by mol of Ti, which exceeds 15 parts by mol, the perovskite-type compound of the main-phase grains was decreased in lattice volume, for this reason, the accessory constituents such as the rare-earth element Re and Si were more likely to be present as a solid solution in the perovskite-type compound containing Ba, Ca, and Ti, as a result, it became difficult to control the grain growth, and the high-temperature load life was decreased.

In addition, in the case of sample number 16, the content of Y is 0.8 parts by mol with respect to 100 parts by mol Ti, which is less than 1.0 part by mol, thus resulting in the high-temperature load life of 13 hours, and the improvement is shown as compared with sample numbers 3 to 9 in Example 1, while the high-temperature load life is shorter as compared with the samples within the preferred ranges. This is believed to be because it was not possible to adequately achieve the effect of suppressing the movements of oxygen vacancies by the addition of Y, due to the smaller molar content of Y.

In addition, in the case of sample number 18, the Si content is 0.4 parts by mol with respect to 100 parts by mol Ti, which is less than 0.5 part by mol, thus resulting in the high-temperature load life of 18 hours, and the improvement is shown as compared with sample numbers 3 to 9 in Example 1, while the high-temperature load life is shorter as compared with the samples within the preferred ranges. This is believed to be because, due to the smaller content of the Si constituent also acting as a sintering aid, the electric field was locally concentrated without being able to achieve adequate densification.

In addition, in the case of sample number 21, the Si content is 3.0 parts by mol with respect to 100 parts by mol Ti, which exceeds 2.5 parts by mol, with the Ca/(Ca+Y+Si) of 4.5%, thus resulting in the high-temperature load life of 21 hours, and the improvement is shown as compared with sample numbers 3 to 9 in Example 1, while the high-temperature load life is shorter as compared with the samples within the preferred ranges.

Example 3

High-purity $BaCO_3$, $CaCO_3$, and $TiO_2$ were prepared as ceramic raw materials, and these ceramic raw materials were weighed for the molar substitution x and compounding molar ratio m of Ca as shown in Table 4. Then, these weighed materials were put along with PSZ balls and pure water into a ball mill, subjected to sufficient mixing and grinding in a wet way, and to drying, and then subjected to calcination at a temperature of 1000 to 1200° C. for about 2 hours, thereby preparing main constituent powders with an average grain size of 0.20 μm.

Next, a rare-earth oxide $Re_2O_2$ (Re: Gd, Tb, Dy, Ho, Er, Tm, and Yb) was prepared, and $SiO_2$, MgO, $MnCO_3$, and $V_2O_5$ were further prepared. Then, these materials were weighed for the contents of the rare-earth element Re, Si, Mg, Mn, and V in terms of parts by mol as shown in Table 4 with respect to 100 parts by mol of the Ti in the main constituent powder, and subjected to wet mixing in a ball mill, and to a drying treatment to obtain ceramic raw material powders.

Further, it has been confirmed by an ICP emission spectrometric analysis that the obtained ceramic raw material powders are nearly identical to the prepared compositions shown in Table 4.

Thereafter, respective samples of sample numbers 31 to 37 were prepared in accordance with the same method and procedure as in Example 1.

It is to be noted that the following firing conditions were applied to any of the samples: 20° C./min as the rate of temperature increase; and 1220° C. as the maximum temperature and 2 hours as the maximum temperature holding time in a reducing atmosphere composed of a $H_2$—$N_2$—$H_2O$ gas with an oxygen partial pressure of $3.1 \times 10^{-10}$ MPa.

Further, it has been confirmed by an ICP emission spectrometric analysis that the respective samples of sample numbers 31 to 37 with the external electrodes removed therefrom, and then the ceramic bodies dissolved in a solvent are nearly identical to the prepared compositions shown in Table 4, except for Ni as an internal electrode constituent.

In addition, it has been confirmed by an XRD structure analysis of the ceramic body that the respective samples with the external electrodes removed therefrom have a perovskite-type structure.

Subsequently, for each sample, respective grains in a cross section for observation were classified into the group of main-phase grains and the group of grains other than the main-phase grains in the same way as in Example 1.

Then, 20 of the main-phase grains were randomly extracted, and subjected to a TEM-EDX analysis in the same way as in Example 1 to check the Ca amount with respect to 100 parts by mol of the Ti contained in the main-phase grains, thereby confirming that the average value for the 20 grains is nearly identical to the prepared composition shown in Table 4.

Furthermore, in accordance with the same method and procedure as in Example 1, the first heterogeneous-phase grains and the second heterogeneous-phase grains were identified from the grains other than the main-phase grains to find the ratio (B/(A+B)) of the number B of the second heterogeneous-phase grains to the total number (A+B) of the first and second heterogeneous-phase grains.

In addition, in accordance with the same method and procedure as in Example 2, a TEM-EDX analysis was carried out near the centers of the grains to measure the contents of Ca, the rare-earth element Re, and Si, and find the average value for Ca/(Ca+Re+Si) in terms of molar ratio.

In addition, the high-temperature load life was calculated in accordance with the same method and procedure as in Example 1.

Table 4 shows the component composition, B/(A+B), Ca/(Ca+Re+Si) value for the first heterogeneous-phase grains, and high-temperature load life for sample numbers 31 to 37.

As is clear from sample numbers 31 to 37, as for the rare-earth elements such as Gd, Tb, Dy, Ho, Er, Tm, and Yb other than Y, the Ca/(Ca+Re+Si) is also 8.0% or more in terms of molar ratio, and it has been confirmed that a high-temperature load life of 30 hours or more can be ensured substantially as in the case of Y (see sample number 17 in Table 3).

Even when a high electric field of 20 kV/mm or more is applied to the thin dielectric ceramic layers on the order of 1 μm in thickness, a sufficient high-temperature load life can be achieved in high-temperature atmosphere.

DESCRIPTION OF REFERENCE SYMBOLS 1 ceramic body
2a to 2f internal electrode layer
6a to 6g dielectric ceramic layer (dielectric layer)

The invention claimed is:

1. A dielectric ceramic comprising:
main-phase grains including a perovskite-type compound containing Ba, Ca, and Ti, the main-phase grains being a main constituent of the dielectric ceramic;
first heterogeneous-phase grains containing Ca, a rare-earth element, and Si; and
second heterogeneous-phase grains containing no Ca and containing the rare-earth element and Si, the second heterogeneous-phase grains being present in the dielectric ceramic in a ratio of 0.05 or less of the number of the second heterogeneous-phase grains to the total of the first heterogeneous-phase grains and the second heterogeneous-phase grains.

2. The dielectric ceramic according to claim 1, wherein the Ca contained in the main-phase grains is present at least near centers of the main-phase grains.

3. The dielectric ceramic according to claim 1, wherein the rare-earth element includes at least one or more elements selected from the group consisting of Y, Gd, Tb, Dy, Ho, Er, Tm, and Yb.

4. The dielectric ceramic according to claim 3, wherein the rare-earth element is in an amount of 1.0 parts by mol or more with respect to 100 parts by mol of the Ti.

5. The dielectric ceramic according to claim 1, wherein the Ca has an 8% or more molar ratio with respect to a total content of the Ca, the rare-earth element, and the Si in the first heterogeneous-phase grains.

6. The dielectric ceramic according to claim 5, wherein the Ca contained in the main-phase grains is in an amount of 3 to 16 parts by mol with respect to 100 parts by mol of the Ti contained in the main-phase grains.

TABLE 4

| Sample Number | $(Ba_{1-x}Ca_x)_mTiO_3$ x | m | Rare-Earth Element Re Elemental Species | Molar Content (parts by mol) | Molar Content of Accessory Constituent other than Rare-Earth Element Re (parts by mol) | | | | B/(A + B) (—) | Ca/(Ca + Re + Si) (%) | High-Temperature Load Life (hr) |
|---|---|---|---|---|---|---|---|---|---|---|---|
| | | | | | Si | Mg | Mn | V | | | |
| 31 | 0.080 | 1.010 | Gd | 2.0 | 1.5 | 0.5 | 0.5 | 0.1 | 0.00 | 16.7 | 40 |
| 32 | 0.080 | 1.010 | Tb | 2.0 | 1.5 | 0.5 | 0.5 | 0.1 | 0.00 | 16.8 | 38 |
| 33 | 0.080 | 1.010 | Dy | 2.0 | 1.5 | 0.5 | 0.5 | 0.1 | 0.00 | 15.4 | 37 |
| 34 | 0.080 | 1.010 | Ho | 2.0 | 1.5 | 0.5 | 0.5 | 0.1 | 0.00 | 14.6 | 31 |
| 35 | 0.080 | 1.010 | Er | 2.0 | 1.5 | 0.5 | 0.5 | 0.1 | 0.00 | 14.0 | 33 |
| 36 | 0.080 | 1.010 | Tm | 2.0 | 1.5 | 0.5 | 0.5 | 0.1 | 0.00 | 13.9 | 32 |
| 37 | 0.080 | 1.010 | Yb | 2.0 | 1.5 | 0.5 | 0.5 | 0.1 | 0.00 | 12.7 | 30 |

7. The dielectric ceramic according to claim 6, wherein the rare-earth element is in an amount of 1.0 parts by mol or more with respect to 100 parts by mol of the Ti.

8. The dielectric ceramic according to claim 7, wherein the Si is in an amount of 0.5 to 2.5 parts by mol with respect to 100 parts by mol of the Ti.

9. The dielectric ceramic according to claim 1, wherein the Ca contained in the main-phase grains is in an amount of 3 to 16 parts by mol with respect to 100 parts by mol of the Ti contained in the main-phase grains.

10. The dielectric ceramic according to claim 1, wherein the rare-earth element is in an amount of 1.0 parts by mol or more with respect to 100 parts by mol of the Ti.

11. The dielectric ceramic according to claim 1, wherein the Si is in an amount of 0.5 to 2.5 parts by mol with respect to 100 parts by mol of the Ti.

12. A laminated ceramic capacitor comprising:
dielectric layers and internal electrodes alternately stacked, wherein the dielectric layers are the dielectric ceramic according to claim 1.

13. The laminated ceramic capacitor according to claim 12, wherein the dielectric layers have a thickness on the order of 1 μm.

14. The laminated ceramic capacitor according to claim 12, wherein the Ca contained in the main-phase grains is present at least near centers of the main-phase grains.

15. The laminated ceramic capacitor according to claim 12, wherein the rare-earth element includes at least one or more elements selected from the group consisting of Y, Gd, Tb, Dy, Ho, Er, Tm, and Yb.

16. The laminated ceramic capacitor according to claim 12, wherein the rare-earth element is in an amount of 1.0 parts by mol or more with respect to 100 parts by mol of the Ti.

17. The laminated ceramic capacitor according to claim 12, wherein the Ca has an 8% or more molar ratio with respect to a total content of the Ca, the rare-earth element, and the Si in the first heterogeneous-phase grains.

18. The laminated ceramic capacitor according to claim 12, wherein the Ca contained in the main-phase grains is in an amount of 3 to 16 parts by mol with respect to 100 parts by mol of the Ti contained in the main-phase grains.

19. The laminated ceramic capacitor according to claim 12, wherein the Si is in an amount of 0.5 to 2.5 parts by mol with respect to 100 parts by mol of the Ti.

* * * * *